(12) United States Patent
Estill

(10) Patent No.: US 8,244,567 B2
(45) Date of Patent: Aug. 14, 2012

(54) BUSINESS GOAL INCENTIVES USING GAMING REWARDS

(75) Inventor: James Estill, Guelph (CA)

(73) Assignee: SYNNEX Corporation, Fremont, CA (US)

( * ) Notice: Subject to any disclaimer, the term of this patent is extended or adjusted under 35 U.S.C. 154(b) by 297 days.

(21) Appl. No.: 12/319,222

(22) Filed: Dec. 31, 2008

(65) Prior Publication Data

US 2010/0169144 A1    Jul. 1, 2010

(51) Int. Cl.
| | |
|---|---|
| G06Q 10/00 | (2012.01) |
| G06Q 30/00 | (2012.01) |
| A63F 9/24 | (2006.01) |
| A63F 13/00 | (2006.01) |
| G06F 17/00 | (2006.01) |
| G06F 19/00 | (2011.01) |

(52) U.S. Cl. ............... 705/7.14; 705/7.37; 705/7.42; 705/14.12; 463/1

(58) Field of Classification Search ............... None
See application file for complete search history.

(56) References Cited

U.S. PATENT DOCUMENTS

| | | | | |
|---|---|---|---|---|
| 5,239,460 | A * | 8/1993 | LaRoche | 705/7.42 |
| 6,009,412 | A * | 12/1999 | Storey | 705/14.27 |
| 6,049,779 | A * | 4/2000 | Berkson | 705/14.39 |
| 6,138,911 | A | 10/2000 | Fredregill | |
| 6,302,793 | B1 | 10/2001 | Fertitta, III | |
| 6,529,878 | B2 * | 3/2003 | De Rafael et al. | 705/14.19 |
| 6,571,216 | B1 | 5/2003 | Garg | |
| 6,578,012 | B1 | 6/2003 | Storey | |
| 6,681,349 | B2 | 1/2004 | Sekizawa | |
| 6,940,615 | B1 | 9/2005 | Shima | |
| 7,025,674 | B2 | 4/2006 | Adams | |
| 7,203,656 | B2 * | 4/2007 | Lotvin et al. | 705/13 |
| 7,362,461 | B2 | 4/2008 | Reddy et al. | |
| 7,389,245 | B1 | 6/2008 | Ashford | |
| 7,390,264 | B2 | 6/2008 | Walker | |
| 7,465,231 | B2 * | 12/2008 | Lewin et al. | 463/37 |
| 8,029,359 | B2 * | 10/2011 | Cheng | 463/25 |
| 2001/0021946 | A1 | 9/2001 | Ogami | |
| 2001/0039497 | A1 | 11/2001 | Hubbard | |
| 2002/0002492 | A1 | 1/2002 | Okazawa | |
| 2002/0030846 | A1 | 3/2002 | Moriyama et al. | |
| 2002/0054345 | A1 | 5/2002 | Tomida et al. | |
| 2003/0020951 | A1 | 1/2003 | Minowa et al. | |
| 2003/0193685 | A1 | 10/2003 | Kageyama | |
| 2003/0200142 | A1 * | 10/2003 | Hicks et al. | 705/14 |
| 2003/0233278 | A1 | 12/2003 | Marshall | |
| 2004/0015608 | A1 * | 1/2004 | Ellis et al. | 709/246 |

(Continued)

OTHER PUBLICATIONS

Shi "Essays on Reward Programs" (1997) Carnegie Mellon University.*

(Continued)

*Primary Examiner* — Lynda C. Jasmin
*Assistant Examiner* — Sujay Koneru
(74) *Attorney, Agent, or Firm* — Carr & Ferrell LLP

(57) ABSTRACT

Gaming rewards are provided as an incentive for performing business goals. A business goal can be comprised of one or more tasks and a threshold for each task. When one or more participants perform tasks which satisfies the corresponding thresholds, a corresponding gaming reward is awarded to the participants. A business goal may require a single participant to satisfy a single task threshold, multiple participants to satisfy a threshold for one or more tasks, or a single participant to satisfy one or more thresholds for several tasks.

17 Claims, 10 Drawing Sheets

U.S. PATENT DOCUMENTS

| | | |
|---|---|---|
| 2004/0083147 A1 | 4/2004 | Aoki |
| 2005/0050527 A1 | 3/2005 | McCrady |
| 2005/0105130 A1 | 5/2005 | Haguida |
| 2005/0165657 A1* | 7/2005 | Aichroth et al. ............... 705/26 |
| 2005/0203766 A1 | 9/2005 | Donaldson |
| 2005/0209917 A1* | 9/2005 | Anderson et al. ............... 705/14 |
| 2005/0244799 A1 | 11/2005 | Skenandore |
| 2006/0020509 A1* | 1/2006 | Strain et al. ..................... 705/14 |
| 2006/0030402 A1 | 2/2006 | Chandrakumar |
| 2006/0047535 A1 | 3/2006 | Fredricksen |
| 2006/0053075 A1 | 3/2006 | Roth et al. |
| 2006/0064481 A1 | 3/2006 | Baron et al. |
| 2006/0116953 A1 | 6/2006 | Davin et al. |
| 2006/0215198 A1 | 9/2006 | Yorimoto |
| 2006/0224451 A1* | 10/2006 | Kerschbrock et al. .......... 705/14 |
| 2006/0267279 A1 | 11/2006 | Smith |
| 2007/0021967 A1 | 1/2007 | Jaligama |
| 2007/0060368 A1 | 3/2007 | Cheng |
| 2007/0167204 A1* | 7/2007 | Lyle et al. ........................ 463/9 |
| 2007/0174113 A1* | 7/2007 | Rowen ............................ 705/14 |
| 2007/0226171 A1 | 9/2007 | Medicke et al. |
| 2008/0027880 A1 | 1/2008 | Yu |
| 2008/0076496 A1* | 3/2008 | Baerlocher et al. ............... 463/1 |
| 2008/0091517 A1 | 4/2008 | Koonce |
| 2008/0109318 A1 | 5/2008 | Szmanda |
| 2008/0167129 A1* | 7/2008 | Aaron et al. .................... 463/42 |
| 2008/0208749 A1* | 8/2008 | Wallace et al. ................. 705/44 |
| 2009/0070202 A1* | 3/2009 | Zitaner et al. ................... 705/11 |

OTHER PUBLICATIONS

Reidman "Alcone's NetPerks to offer rewards to frequent surfers" (1997) Advertising Age, vol. 68, No. 1.*

Brown, John Seely and Thomas, Douglas, "The Gamer Disposition," Harvard Business Review, Feb. 2008, p. 28.

* cited by examiner

Business Goal Table

| TASK ID | Business Metric Threshold | Reward ID | Reward Description |
|---|---|---|---|
| 1 | 500 (products sold) | 1 | Chief |
| 2 | 1000 (products sold) | 2 | Warlord |
| 3 | 2000 (products sold) | 3 | Grand Master |
| 4 | 100 (calls) | 4 | Invisibility |
| 5 | 50 (emails returned in 6 hrs) | 5 | 100 red points |
| 6 | 50 (emails returned in 24 hrs) | 6 | 30 green points |
| 7 | 10 (days without an accident) | 7 | Sword |
| 8 | 5 (training hours) | 8 | Shield |
| 9 | 20 (account updates) | 9 | Ray gun |
| 10 | Task ID 1 + Task ID 3 | 10 | Grand PooBa |

Status table

| Participant | Task ID | Qty | Status | Task ID | Qty | Status | Task ID | Qty | Status | Updated |
|---|---|---|---|---|---|---|---|---|---|---|
| Participant 1 | 2 | 502 | Chief | 4 | 113 | Invisibility | 5 | 51 | 100 Red Pts | Yes |
| Participant 2 | 3 | 1012 | Warlord | 4 | 87 | | 6 | 50 | 100 green pts | No |
| Group 1 | 1 | 490 | | 3 | 65 | | | | | No |

BUSINESS GOAL INCENTIVES USING GAMING REWARDS

BACKGROUND

1. Field of the Invention

The present invention generally relates to managing incentives. More specifically, the present invention relates to managing business goal incentives.

2. Description of the Related Art

Businesses often provide tangible performance rewards to employees. For example, many businesses provide employees with a financial bonus based on sales or a plaque based on product awards. While these financial and trophy incentives may be valuable, they typically do not evoke passion for doing one's job within the workplace. Furthermore, the tangible awards are often provided for individual achievements by the employee rather than achievements attained by a group of employees.

SUMMARY OF THE PRESENTLY CLAIMED INVENTION

In exemplary embodiments, gaming rewards are provided as an incentive for achieving business goals. A business goal can be comprised of one or more tasks and a threshold associated with each task. When one or more participants perform tasks which satisfies the corresponding thresholds of the business goal, a gaming reward is provided to the participants. The business goals can be associated with various areas of a business, such as sales, accounting, shipping, receiving, product design, marketing, software programming, legal, and/or other business areas. A gaming reward can be a virtual, non-tangible reward, such as a virtual object, title, ability, power, or some other virtual reward. In various embodiments, a business goal may require a single participant to satisfy a single task threshold, multiple participants to satisfy thresholds for one or more tasks, or a single participant to satisfy a threshold for several tasks. Different combinations of tasks and participants may be used to encourage teamwork and individual behavior.

In some embodiments, a method for providing incentives to business participants may begin with a server being provided with data concerning participant performance of tasks directed toward a business goal. The user task data can then be compared a threshold associated with the business goal. A gaming reward can then be reported by the server to the participant when the event data satisfies the threshold.

In some embodiments, a method for storing gaming rewards for participants begins with a server setting a threshold associated with a business goal. Both the business goal and the threshold associated with the business goal may be designated by a user, such as an administrator, supervisor, business manager, etc. A gaming reward is then linked with the business goal by the server. The server then receives quantitative data associated with a participant engaged in tasks directed toward the business goal. The server then determines the gaming reward and stores the gaming reward information in the first participant account when the quantitative data satisfies the threshold.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

BRIEF DESCRIPTION OF THE DRAWINGS

FIG. 1C is an exemplary business goal table.

FIG. 1D is an exemplary status table.

DETAILED DESCRIPTION

Embodiments of the present invention provide gaming rewards as an incentive for achieving business goals. A business goal may encompass one or more tasks and a threshold for each task. Participants perform the tasks in a business environment. When the participant's performance of a task satisfies a corresponding threshold, the participant has achieved the business goal, and a gaming reward is provided to the participant. The business goals can be associated with areas of a business, such as sales, accounting, shipping, receiving, product design, marketing, software programming, legal, and/or other business areas. A gaming reward can be associated with a virtual, non-tangible reward, such as a virtual object, title, ability, power, points, or some other virtual reward. The gaming reward may be similar to a reward received in an electronic game, such as a video game.

Achieving a business goal can require one or more participants to perform multiple tasks to obtain a gaming reward. A business goal may require multiple participants to satisfy a threshold for one or more tasks. For example, a business goal can require a team of sales people to each sell three hundred products. In another example, a business goal may require a sales person to sell three hundred products, a development person to generate fifty sales leads for the product, and a software programmer to generate three hundred lines of comment code for the product. A business goal may also require one participant to satisfy a threshold for several tasks. A business goal can require a sales person to sell three hundred products and update twenty account profiles. Business goals can be used to encourage participants to work as a team by requiring multiple participants to meet a threshold for one or more tasks. A business goal can be also used to encourage the participant to focus on various aspects of their job and become a more balanced contributor for their employer by requiring a single participant to meet thresholds for each of several tasks.

Figure 1A:
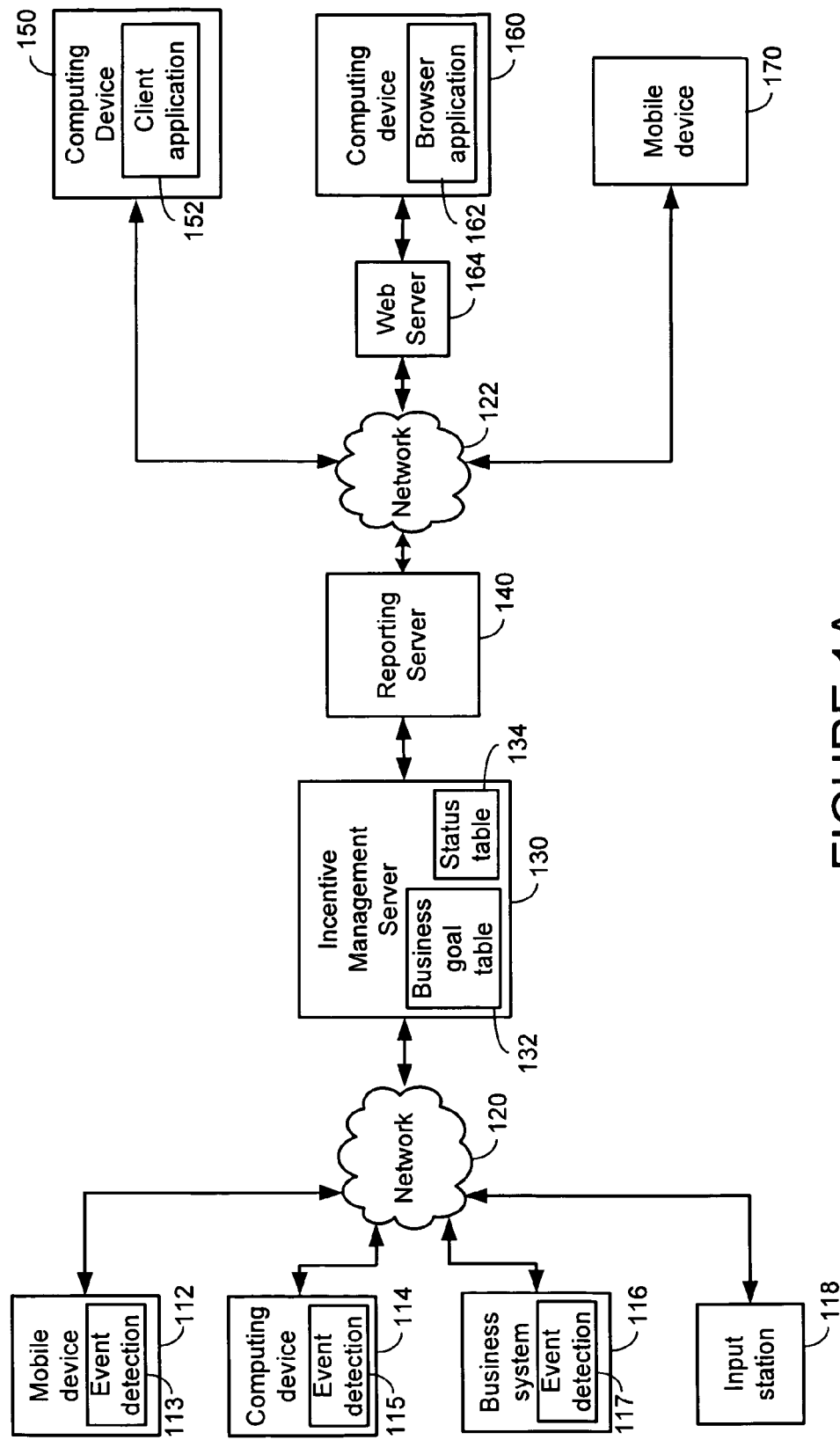
FIG. 1A is a block diagram of an exemplary system for providing business incentives using gaming rewards.

FIG. 1A is a block diagram of an exemplary system for providing business incentives using gaming rewards. FIG. 1A includes mobile device 112, computing device 114, business system 116, and input station 118 in communication with incentive management server 130 over network 120. Computing device 150, web server 164, and mobile device 170 are in communication with reporting server 140 over network 122. Web server 164 is also in communication with computing device 160.

Mobile device 112, computing device 114, business system 116 may be used to perform tasks, document data concerning the tasks, and provide raw data and/or metric data concerning the tasks to incentive management server 130. Mobile device 112, computing device 114, and business system 116 may each include an event detection module (i.e., event detection module 113, 115, or 117) which may be inclusive of software and corresponding hardware for detecting an event associated with a business task. The detected event data may be processed and reported to incentive management server 130. The event detection module 113 may also generate metric data from the event data and report the metric data to incentive management server 130.

Mobile device 112 may encompass a mobile device such as a cellular phone, personal digital assistant, mobile or notebook computer, or some other mobile device. Event detection module 113 on mobile device 112 may detect and track information concerning each call a participant has made to a particular customer, such as the time and date of each call, the duration of each call, and whether the participant answered the call or initiated the call Computing device 114 may be implemented as desktop computer, networking station, or some other computing device. Event detection module 115 on computing device 114 may detect and track information concerning actions performed using the computing device. For example, event detection module 115 may monitor e-mails sent by a participant, including emails sent to a particular customer email address, number of emails sent, time stamp data for each email, or keyword data within the emails.

Business system 116 may be implemented as a variety of systems used in the course of business. Business system 116 may include a phone system, shipment or delivery tracking system, or some other system utilizing hardware and/or software used to document performance of one or more business tasks. Business system 116 may include an event detection module 117 for detecting, processing, and reporting event data associated with a business goal. For example, the event detection module 117 may detect and log data associated with calls made by a participant's phone, including numbers called, timestamp data, and length of call. Information logged by the various event detection modules may be reported to the incentive management server 130 as raw data and/or as metrics calculated from the raw data.

Input station 118 may include any computing device or other device through which event data or metric data associated with completion of a business goal may be provided. Input station 118 can be used to input data that may not be otherwise detected or computed, such as the number of networking events a participant has attended or the number of hours that a participant has spent training other employees. Input station 118 may receive, process, and report such event data to incentive management server 130.

Networks 120 and 122 may be implemented as networks over which data can be communicated. For example, networks 120 and 122 may each be implemented as any combination of the Internet or other WAN, a LAN, intranet, extranet, private network or other network, or any combination of these. In some embodiments, networks 120 and 122 may also include a mobile device data network and/or telecommunications network for communicating data to and from mobile devices 112 and 170.

Incentive management server 130 may include hardware and/or software configured to receive data from various sources (e.g., elements 112-118) over network 120, process the received data, and manage business goals for a set of participants. Managing business goals may include defining business goals and gaming rewards, associating gaming rewards with business goals, managing participant records concerning business goals completed and in progress, communicating business goal data to reporting server 140, etc.

Incentive management server 130 may store data, for example, in a business goal table 132 and a status table 134. Business goal table 132 contains a listing of various business goals, each associated with a gaming reward. An example of business goal table 132 is illustrated in FIG. 1C. Status table 134 contains information concerning gaming reward status associated with a participant or group of participants. An example of a status table 134 is illustrated in FIG. 1D.

Reporting server 140 may access and report the status of a participant, for example, with respect to gaming rewards associated with the participant. For example, reporting server 140 may report a participant's status via SMS or MMS message, e-mail, instant message, fax, pager, or content page such as a web page. The status information reported for the participant may include the gaming rewards earned, the progress towards a business goal, remaining tasks required to achieve a business goal, and other information. The report may be sent to the individual participant, a participant team, a supervisor, a manager, or any combination of the foregoing.

Computing devices 150 and 160 may be implemented by a computing system similar to that of computing device 114, or as the same computing device. Client application 152 and browser application 162 on computing devices 150 and 160, respectively, may be used to receive, access, and/or display reports of a participant's status sent from the reporting server 140. For example, the client application 152 may receive data from reporting server 140 that can be processed and displayed in an interface or toolbar. The browser application 162 may receive information, such as HTML or other data constituting a web page or content page, from reporting server 140 through the web server 164 and display the information.

Mobile device 170 may be implemented as a mobile device, such as a cellular phone, personal digital assistant, or mobile or notebook computer. Reports from reporting server 140 may be transmitted over network 122 and received by mobile device 170. The reports may be in the form of a text message, SMS message or MMS message. The received reports may indicate new gaming rewards received, the progress towards a gaming reward, or other data concerning business goals of a participant (e.g., the user of the mobile device 170), or other participants.

Figure 1B:
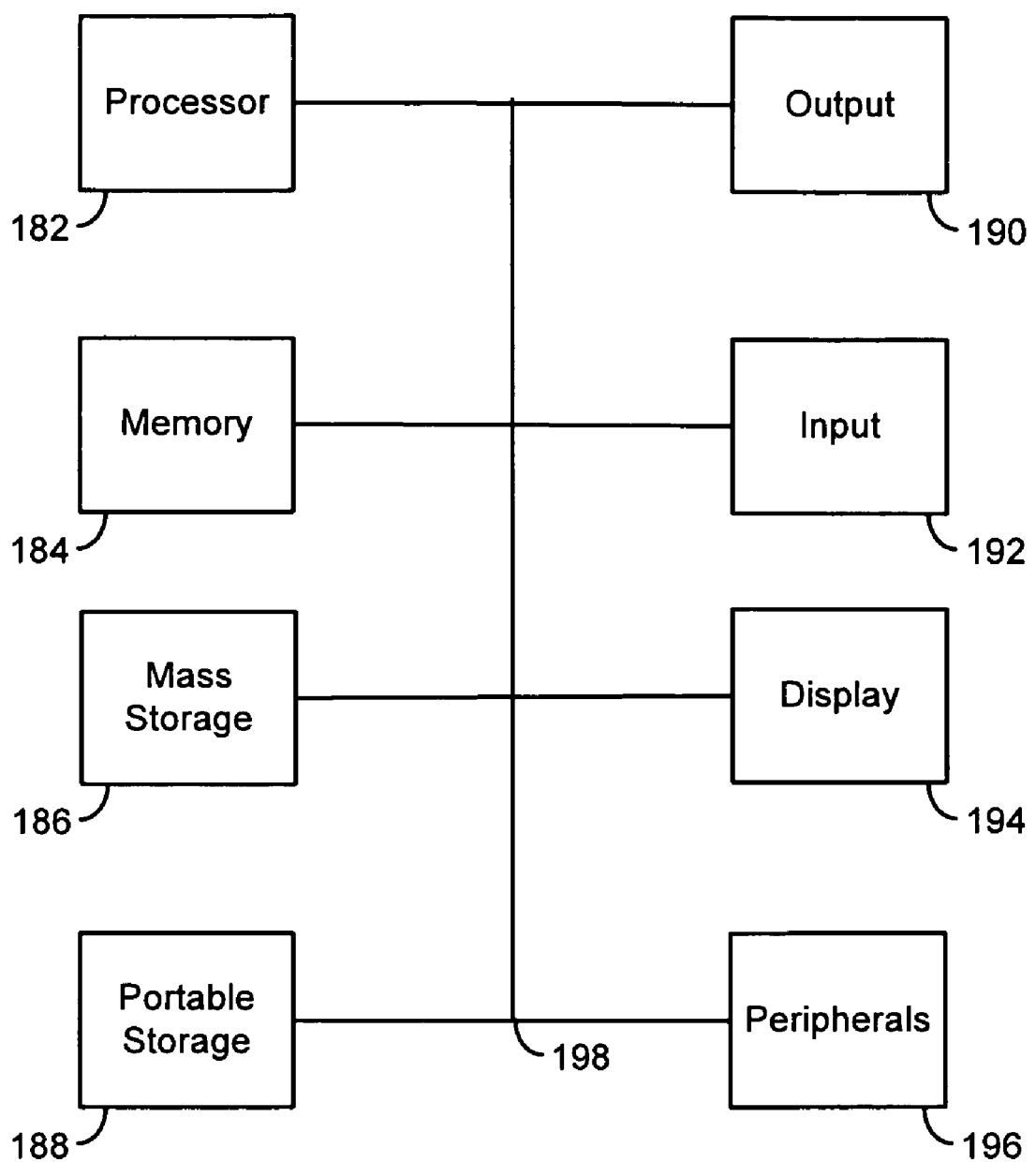
FIG. 1B is a block diagram of a computing environment in which an exemplary system for providing business incentives using gaming rewards may be implemented.

FIG. 1B is a block diagram of an embodiment of a computing environment in which an exemplary system for providing business incentives using gaming rewards may be implemented. The computing environment of FIG. 1B may be used to implement server 130, server 140, computing device 150, or computing device 160 (all illustrated FIG. 1A).

The computer environment as illustrated in FIG. 1B includes one or more processors 182, main memory 184, mass storage 186 and portable storage 188. Main memory 184 stores instructions for execution by the processor unit 182. Main memory 184 can store at least a portion of the executable code when the computing environment is operating. The computer environment of FIG. 1B further includes output devices 190, input device 192, display device 194, and peripherals 196. For purposes of illustration, a single data bus 198 is shown connecting all the elements. However, the elements of the computing system may be connected by one or more data busses or other data transport mechanisms, such as a microprocessor bus connecting one or more processors 182 to memory 184, mass storage 186 or portable storage 188.

Mass storage device 186, which may be implemented as a magnetic disk drive, optical disk drive, or other storage medium is a non-volatile storage device for storing data and instructions for use by processor unit 182. Mass storage device 186 may store the system software for implementing the present technology for purposes of loading to main memory 184.

Portable storage drive 188 operates in conjunction with a portable non-volatile storage medium, such as a floppy disk, compact disk or DVD disk, to input and output data to and from the computer system of FIG. 1B. In one embodiment, the system software for implementing the present technology is stored on such portable storage device 188.

User input device(s) 192 provide a portion of a user interface through which data can be received as input. User input device(s) 192 may include an alpha-numeric keypad, such as keyboard, for inputting alpha-numeric and other information, a pointing device, such as a mouse, a trackball, stylus, or cursor direction keys, a touch screen, microphone, or some other device. Examples of suitable output devices include speakers, printers, network interfaces, monitors, and so on.

The computer system of FIG. 1B includes display 194 for displaying textual and graphical information. Display 194 may include a cathode ray tube (CRT) display, liquid crystal display (LCD), or other display device. The computing environment may also include a graphics processor that receives textual and graphical information and processes the information for output and display on display 194.

Peripheral device(s) 196 may include any type of computer support device, such as an a modem, router, or other device which adds additional functionality to the computer system.

The components contained in the computer environment of FIG. 1B are exemplary and are intended to represent a broad category of computer components that are well known in the art. Thus, the computer system of FIG. 1B can be a personal computer, mobile computing device, workstation, server, minicomputer, mainframe computer, or any other computing device. The computer can also include different bus configurations, networked platforms, multi-processor platforms, and so forth, and utilize various operating systems, including Unix, Linux, Windows, Macintosh OS, or Palm OS.

FIG. 1C is an exemplary business goal table 132 (illustrated in FIG. 1A). The business goal table 132 contains information concerning various business goals and associated gaming rewards. In the table of FIG. 1C, ten business goals are listed as being associated particular gaming rewards. For example, task ID No. 1 indicates that a threshold of 500 sold products is associated with reward ID No. 1 of a title of "Chief." Task ID No. 2 is associated with 1,000 products sold and a reward ID No. 2 of a title "Warlord." Task ID No. 3 associates 2,000 sold products to a title of "Grand Master." Task ID No. 4 associates 100 phone calls with a reward ID No. 4 associated with a virtual power of invisibility. Task ID Nos. 5 and 6 associates a number of e-mails with a type and number of points, for example, 50 e-mails returned in six hours for 100 red points and 50 e-mails returned in 24 hours for 30 green points. Task IDs 7-9 associate thresholds with intangible reward objects. For example, ten days without an accident is associated with a virtual sword reward; completion of five training hours is associated with a virtual shield reward, and twenty account updates is associated with a virtual ray gun reward. Task ID 10 associates a plurality of previously defined business goals with a single reward. Specifically, task ID 10 indicates that task ID 1 and task ID 3 are associated with a title of "Grand Poobah."

FIG. 1D is an exemplary status table 134 (illustrated in FIG. 1A). The status table of FIG. 1D includes column headings of Participant, Task ID, Quantity, Status, Task ID, Quantity, Status, Task ID, Quantity, Status and Updated. As illustrated, each participant may be associated with several task ID and quantity associations. For example, the reward record for participant "user 1" has data for task IDs 2, 4 and 5. The quantities and status associated with these tasks, respectively, indicate 502 products sold and an associated title status of Chief, 113 call made and an associated reward status of virtual invisibility, and 51 emails returned and an associated point status of 100 red points. Further, the "Updated" column indicates that the record for user 1 has been updated.

Figure 2:
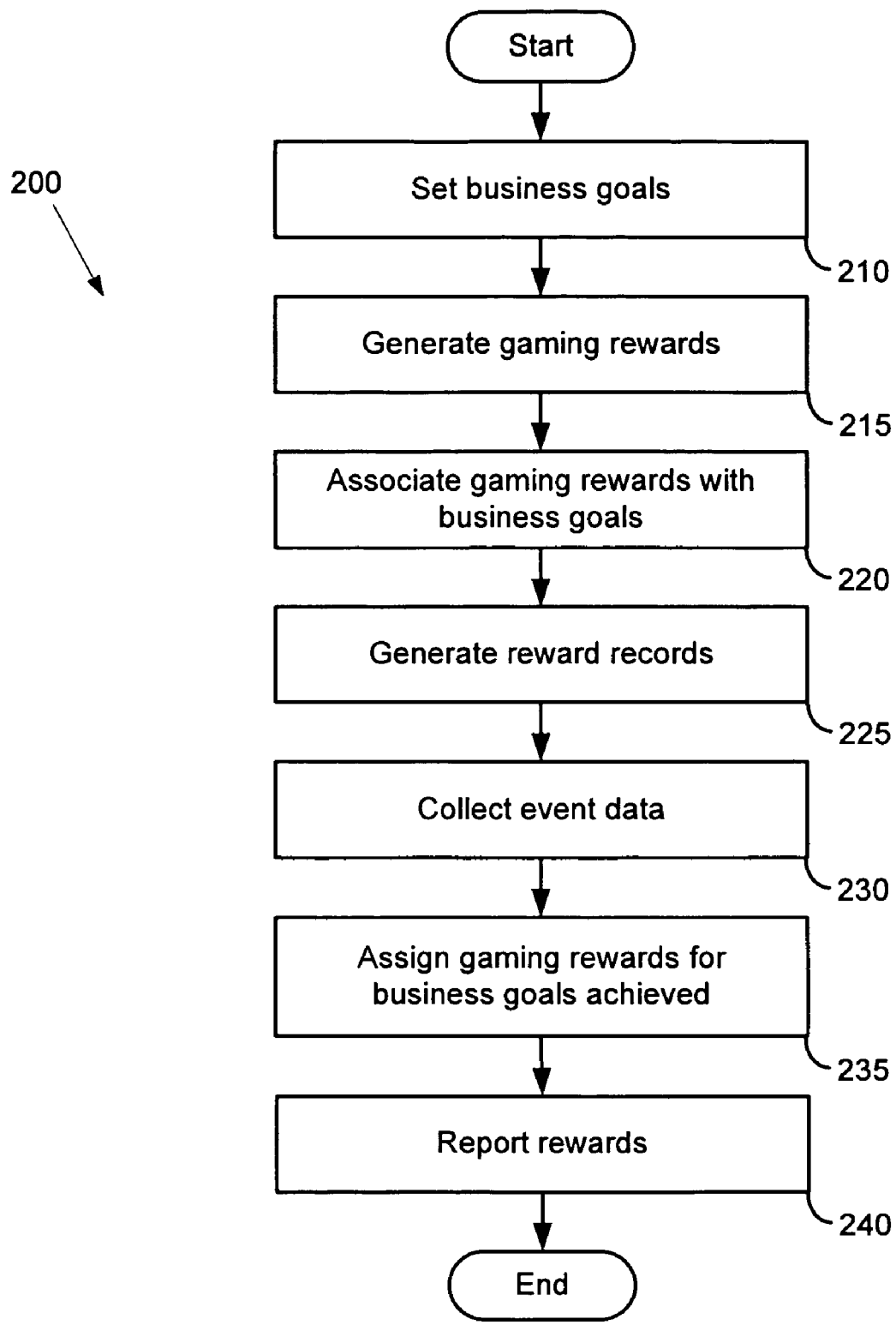
FIG. 2 is a flowchart illustrating an exemplary method of providing business incentives using gaming rewards.

FIG. 2 is a flow chart of an exemplary method 200 for providing business goal incentives using gaming rewards. The method 200 of FIG. 2 may correspond to the operation of incentive management server 130 and reporting server 140. The method 200 of FIG. 2 may be embodied in processor-executable code implementing the same.

In step 210, business goals are set. Setting a business goal can involve specifying a type of task and a threshold to satisfy with respect to the task. A business goal can be defined as conducting twenty phone calls or selling five hundred products.

Different quantities may be used for similar tasks, thereby allowing business goals to be associated with different levels of achievement of a task. For example, a first business goal may be defined as making 50 phone calls, and a second business goal may be defined as making 100 phone calls. Additionally, business goals may be set for groups of participants or as multiple business goals to be achieved by one participant. Setting business goals is discussed in more detail below with respect to FIG. 3.

Gaming rewards are generated at step 215. The gaming rewards may indicate a virtual title, item, power, ability, points or other element to be associated with a participant who successfully achieves a particular business goal. Gaming rewards may be provided by default information, generated manually by a user through, for example, input station 118, or received from an external source. In some embodiments, generating the gaming rewards includes accessing gaming reward data and storing the gaming reward data to local memory.

Examples of gaming rewards may include virtual items such as a sword, shield, dagger, or some other item associated with a game, a virtual power or ability such as invisibility, flying, or telekinesis, a title such as "Warlord," "Master," or "Grand Poobah," an accumulation of various types of points, such as red, blue, or green points. Such virtual powers, titles, and points may be awarded and reported, for example, in a company or department scoreboard. In some instances, such virtual rewards may further be associated with real-world advantages, privileges, and commendations.

After the gaming rewards are generated, the gaming rewards are associated with one or more business goals at step 220. Each business goal may be associated with one or more gaming rewards based on default designation, manual designation from an administrator, random selection by an automated process, or a combination of the above.

Reward records are generated for participants and groups at step 225. The reward records may be stored in a status table 134 (in FIG. 1A) within or accessible by incentive management server 130. The reward records may be stored in memory on incentive management server 130 or on a remote storage device, which may be coupled to and accessible by the incentive management server 130. The status table 134 may include participant or group information (such as name, title, group name, members of group, and other data), gaming reward status (such as the progress toward achieving business goals and gaming rewards), and other information for each participant or group. The reward records may be updated for each participant as new event and/or metric data is received. An example of reward records within a status table 134 is illustrated in FIG. 1D.

Event data for one or more participants is collected at step 230. Event data may be provided by devices 112-118 upon request, as an automatic update, and/or as a periodic update to incentive management server 130. The event data, in an exemplary embodiment, is converted to business metric data by the incentive management server 130 in order to update a reward record for a participant or group within the status table 134. For example, raw event data may include a list of sales receipts. Such information may be used to determine various metrics, such as units sold, sales revenue, sales by customer, by seller, or by sales team. Such information may be used to update the reward record(s) for the participant or group. Collecting event data is discussed in more detail below with respect to FIG. 5, and calculating metrics is discussed in more detail below with respect to FIG. 6.

At step 235, gaming rewards are given to participants or groups that have achieved certain business goals. Reward records within status table 134 may be updated based on new event data. Business goals are evaluated in light of the new event data to determine whether any business goals have been successfully achieved. If so, new gaming rewards are awarded to the successful participant or group and associated with the successful participant or group identifier in status table 134. Assigning gaming rewards to participants based on business goals achieved is discussed in more detail below with respect to FIG. 7.

After the new gaming rewards are awarded, the new gaming rewards are reported at step 240. The gaming rewards may be reported to the participant or participant group, a department, a supervisor or manager, a central reporting interface, or some other location in any of several ways, including e-mail, instant messaging, a web page or other content page, or in some other manner. Reporting rewards is discussed in more detail below with respect to FIG. 8.

Figure 3:
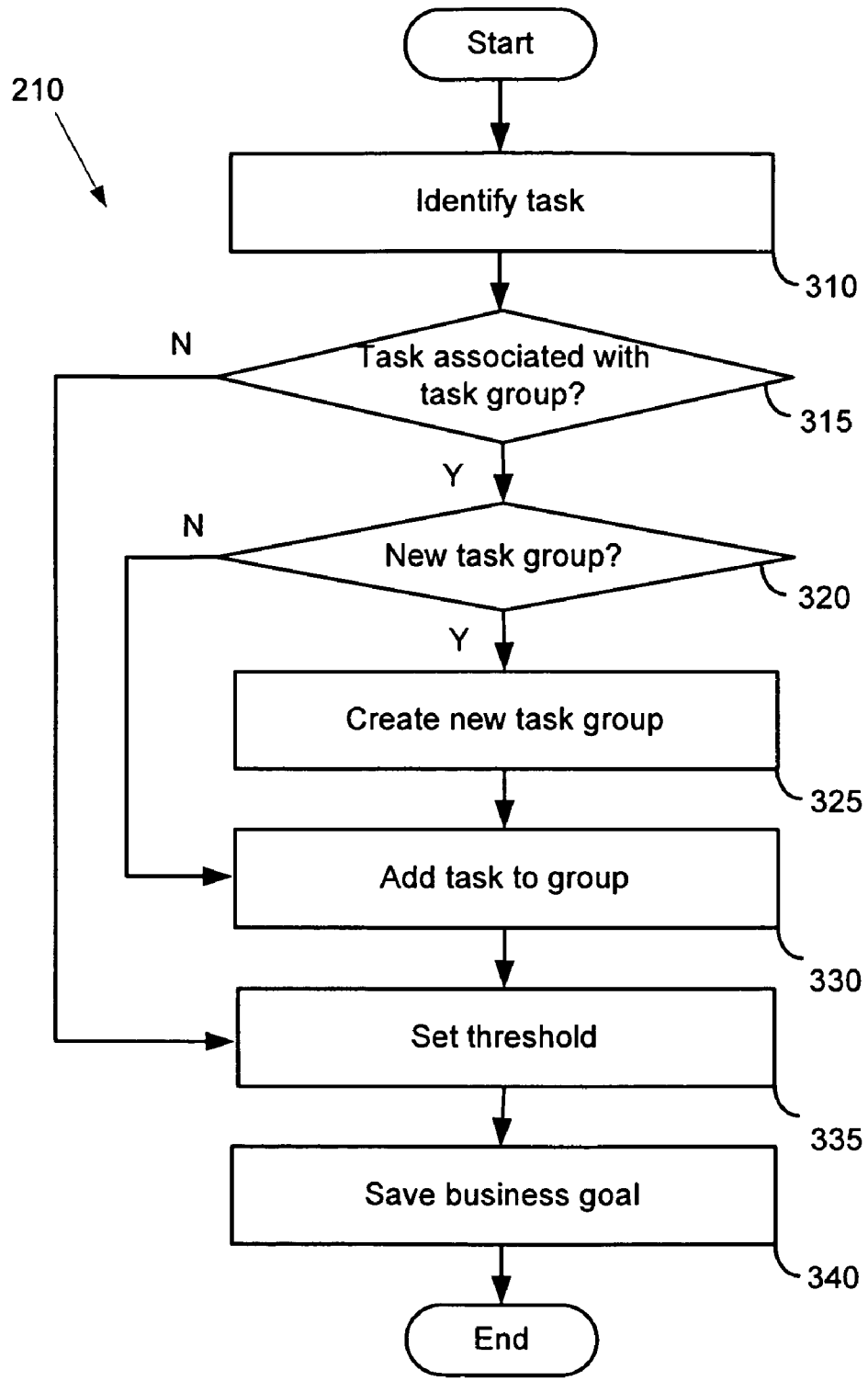
FIG. 3 is a flowchart illustrating an exemplary method for setting business goals.

FIG. 3 is a flowchart illustrating an exemplary method 210 for setting business goals. FIG. 3 provides more detail for step 210 of the method of FIG. 2. In some embodiments, the method of FIG. 3 may be implemented in the context of a graphical user interface or some other computer-implemented mechanism or process that allows the incentive management server 130 to receive input concerning business goals.

In step 310, a task identifier is set. The task identifier may indicate the type of business task (e.g., a phone call or a sent e-mail). A different task identifier can be associated with different types of business tasks. For example, a phone call may be designated by the task identifier 1, an email may be designated by the task identifier 2. A task identifier may also be associated with a particular type of task per business group. For example, a phone call by a sales person and a phone call by a business development person may have different task identifiers. Setting the task identifier can include generating the identifier based on received input, automatically generating the identifier from a default value, or a combination of the above. For example, a user may define task identifiers based on department, such that tasks identifiers for the sales department are the 100-199 range and tasks for the accounting department are in the 200-299 range, etc.

In step 315, a determination is made as to whether the task identifier defined in step 310 is further associated with a task group. A business goal may require performance of more than one type of task to earn a gaming reward. Associating more than one task with a gaming reward may allow teams of participants to work together to achieve a business goal, or for one participant to perform different tasks to get a reward.

For example, achieving a business goal may require a business development person to generate twenty potential business leads and a salesperson to make five phone calls to each potential business lead. In another example, the business goal might require a salesperson to conduct twenty phone calls and send thirty e-mails. If a task is not associated with a task group, then the business goal is saved at step 340, and the method of FIG. 3 ends.

If the task defined in step 310 is determined to be associated with a task group at step 315, another determination is made at step 320 as to whether a new group should be generated. The user may indicate, for example, that he/she wishes to create a new task group. The new group is created in step 325 based on the received user input. The new business goal group data may include the name of the group, the identifier of the group, a business category for the group, and other group information. If the task group already exists, then a new task group does not need to be created. The task defined in step 310 is added to the existing group at step 330.

A threshold is set in step 335. The threshold is defined and associated with the task identifier defined in step 310. In some embodiments, the threshold may be defined as a numeric value such as one hundred, a state value, or some other discernable threshold. In exemplary embodiments, the threshold may be generated based on user input, default data accessed from local memory or transmitted from a remote device, etc. A participant category may also be associated with the threshold (e.g., sales, administration, shipping, or some other business group). The category information can be used to identify what participants or groups may be eligible to achieve a particular business goal (i.e., receive rewards based on a particular threshold).

The method of FIG. 3 continues in step 340 where the business goal is saved. The task(s) and associated threshold(s) for each business goal may be saved in a business goal table such as that illustrated in FIG. 1C by incentive management server 130.

Figure 4:
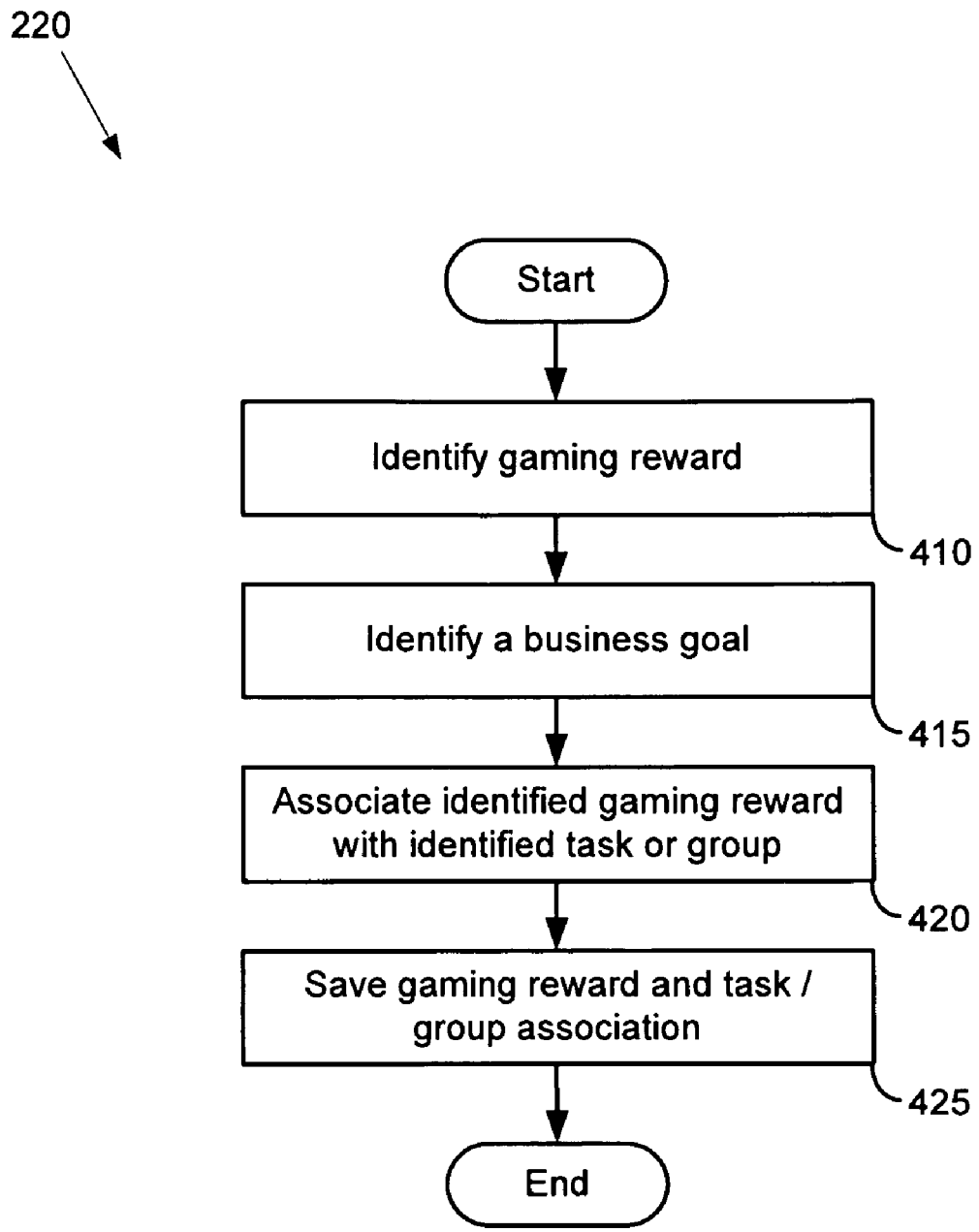
FIG. 4 is a flow chart illustrating an exemplary method for associating gaming rewards with a business goal.

FIG. 4 is a flowchart illustrating an exemplary method 220 for associating gaming rewards with a business goal. The method of FIG. 4 provides more detail for step 220 of the method of FIG. 2. Associating a gaming reward with a business goal may be implemented at least in part using an interface for an administrator to define and designate the gaming rewards associated with each business goal. The business goal and gaming reward association data may be received by incentive management server 130 and stored in business goal table 130.

In step 410, a gaming reward is identified based on user designation. A pool of available gaming rewards may be retrieved from the business goal table 132, from local or remote storage, or from some other source. The user (e.g., an administrator, supervisor, or manager) may select a gaming reward from a menu of available gaming rewards. The gaming rewards may be defined based on default reward information, defined previously by the user, or newly defined based on user input.

In step 415, a business goal may be identified based on user designated. The designated business goal may be a business goal set and defined according to the method of FIG. 3.

In step 420, the identified gaming reward is associated with the identified business goal, such that achievement of the business goal results in award of the identified gaming reward to the participant or group that completes the business goal. The identified business goal is stored in associated with the identified gaming reward in step 425. In exemplary embodiments, the business goal and the associated gaming reward are saved to memory incentive management server 130 as part of business goal table 132.

Figure 5:
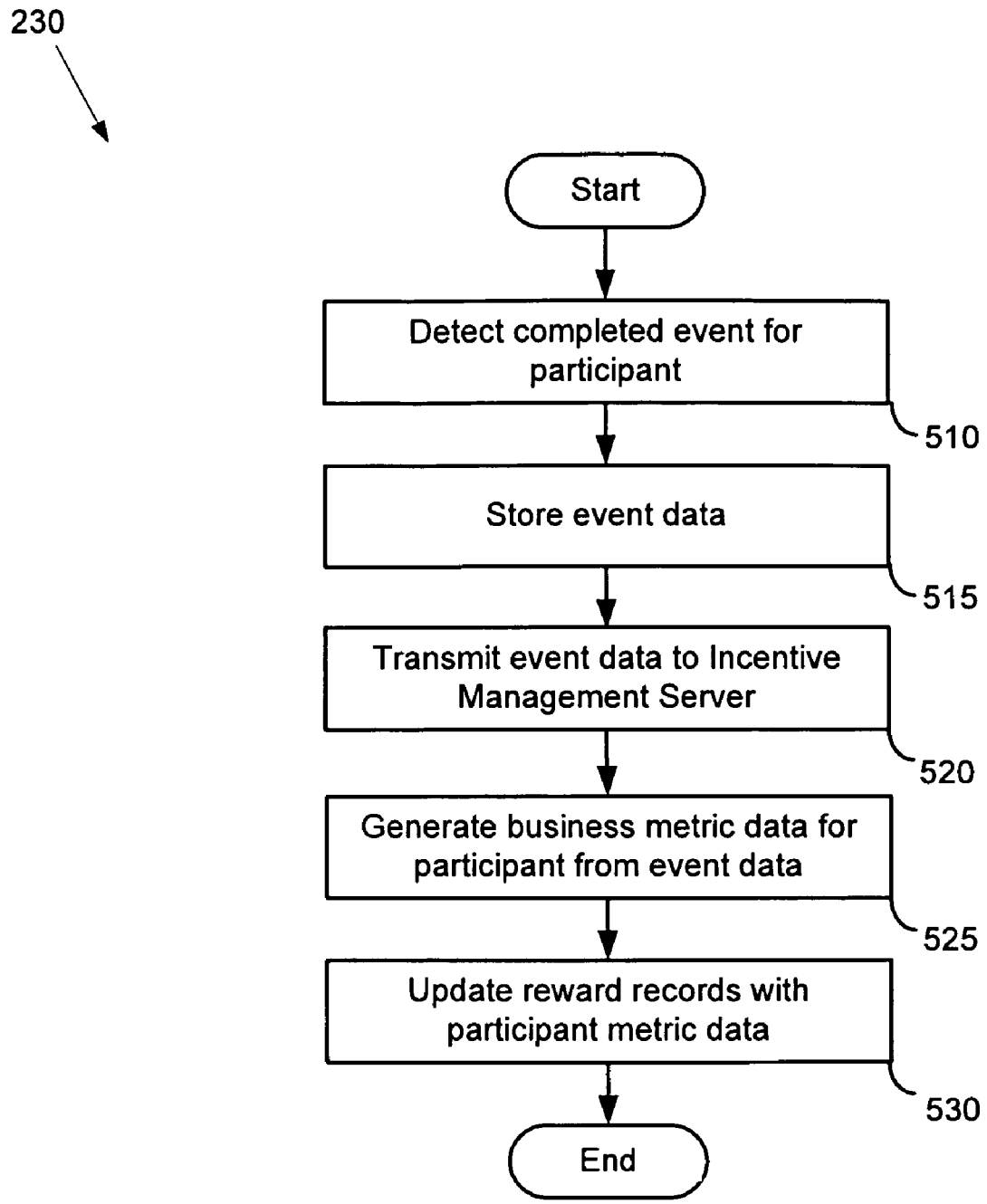
FIG. 5 is a flowchart illustrating an exemplary method for collecting event data for a participant.

FIG. 5 is a flowchart illustrating an exemplary method 230 for collecting event data for a participant. The method of FIG. 5 provides more detail for step 230 of the method of FIG. 2. Steps 510-525 may be performed by any device (e.g., elements 112-118 of FIG. 1A) that detects an event. Steps 530-540 may be performed by incentive management server 130.

In step 510, event data for a participant is detected. The event data may indicate a phone call made, a transmitted e-mail, a received shipment, an update to a record, or some other event which is detectable, measurable, and associated with conducting business. When an event is detected, the event data associated with that event is stored at step 515. The event data may be stored, for example, within memory, such as a cache memory, in computing device 114, business system 116, or mobile device 112.

In step 520, event data is transmitted to incentive management server 130. The data may be transmitted automatically, periodically, in response to updates, in response to user input, in response to a query from incentive management server 130, and/or based on some other event. In some embodiments, transmission of the data occurs in response to detecting the event data in step 510.

The transmitted event data can include user identification for the user that completed the event, task identification information, time and date information, source (for example, an identifier for the phone from which a call was made), quantity (for example, the number of calls and/or time spent on phone calls) and other data for the event.

The event data may be received by the incentive management server 130 and stored either locally or remotely. In step 530, metric data can be generated at incentive management server 130 based on the event data. Relevant event data received from the reporting device may need to be extracted from other data and analyzed to determine whether a business goal has been completed. In this case, the event data may need to be transformed or otherwise used to generate metric data, which can then be used by the incentive management server 130 to determine if a gaming reward should be provided to the user. In some embodiments, the metrics may have been generated by the device that detected the event at step 510 and included in the transmission to the incentive management server 130. The incentive management server 130 may utilize the event data itself to determine if a gaming reward has been earned by a user.

Reward records are updated based on participant metric data at step 530. The received metric data is added to the reward records for participants and/or groups who performed events associated with the metric data. When storing the metric data in a reward record, the reward record can be marked, flagged, or otherwise identified to indicate that the reward record is updated with new metric data and may need to be updated with a new gaming reward. Updating one or more reward records with participant metric data is discussed in more detail below with respect to FIG. 6.

Figure 6:
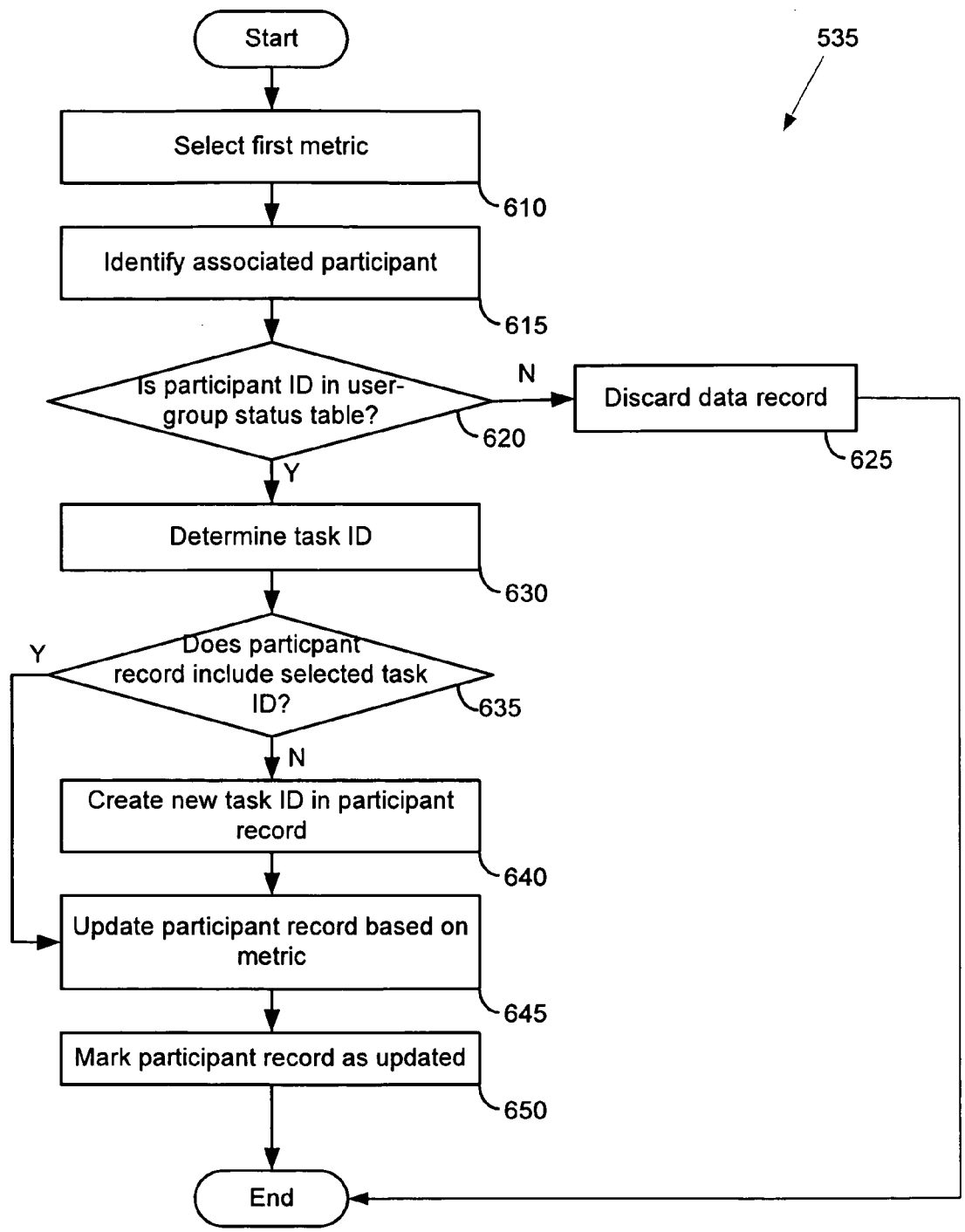
FIG. 6 is a flowchart illustrating an exemplary method for updating participant records with metric data.

FIG. 6 is a flowchart illustrating an exemplary method 530 for updating reward records with metric data. In some embodiments, the method of FIG. 6 provides more detail for step 530 of the method of FIG. 5 and is performed on incentive management server 130.

A first metric is selected at step 610. The first metric may be selected from a set of metric data generated in step 525 in the method of FIG. 5. For example, a set of metric data records may include metrics concerning phone calls made by four different participants using a particular phone system.

In step 615, a participant identifier associated with the selected metric is identified. In step 620, a determination is made as to whether the identified participant identifier is contained in a status table (e.g., status table 134 of FIG. 1D). The participant identifier may indicate an individual or a group. If the selected participant identifier is not included in the status table, the metric data record can be discarded in step 625. In some embodiments, rather than discard the metric data record, a new reward record can be generated for the identified participant and inserted into status table 134 and the method of FIG. 6 may then continue to step 630.

If the selected participant identifier is found in the status table, the selected metric is evaluated in step 630 to determine what task identifier is associated with the metric. For example, the metric may indicate that participant 1 has made 10 phone calls. Phone calls are associated with task identifier 4, as defined by business goal table 132.

In step 635, a determination is made as to whether the reward record for the identified participant already includes the task identifier. Thus, after confirming that the participant has a reward record, a determination is made as to whether the participant's reward record has existing data for the task performed by the participant.

If the reward record includes the selected task identifier, the metric may be used to update the existing data in step 645. For example, the 10 phone calls for Participant 1 May be Added to the 113 Phone Calls Logged in Status Table 134

If the reward record does not include the selected task identifier, a new task identifier and associated quantity and reward fields may be created in step 640, and the selected metric is used to update the newly created fields in step 645. After updating the reward records based on the selected metric, the updated reward record is marked as updated at step 650. Records that have not been updated may also be indicated in the status table 134.

Figure 7:
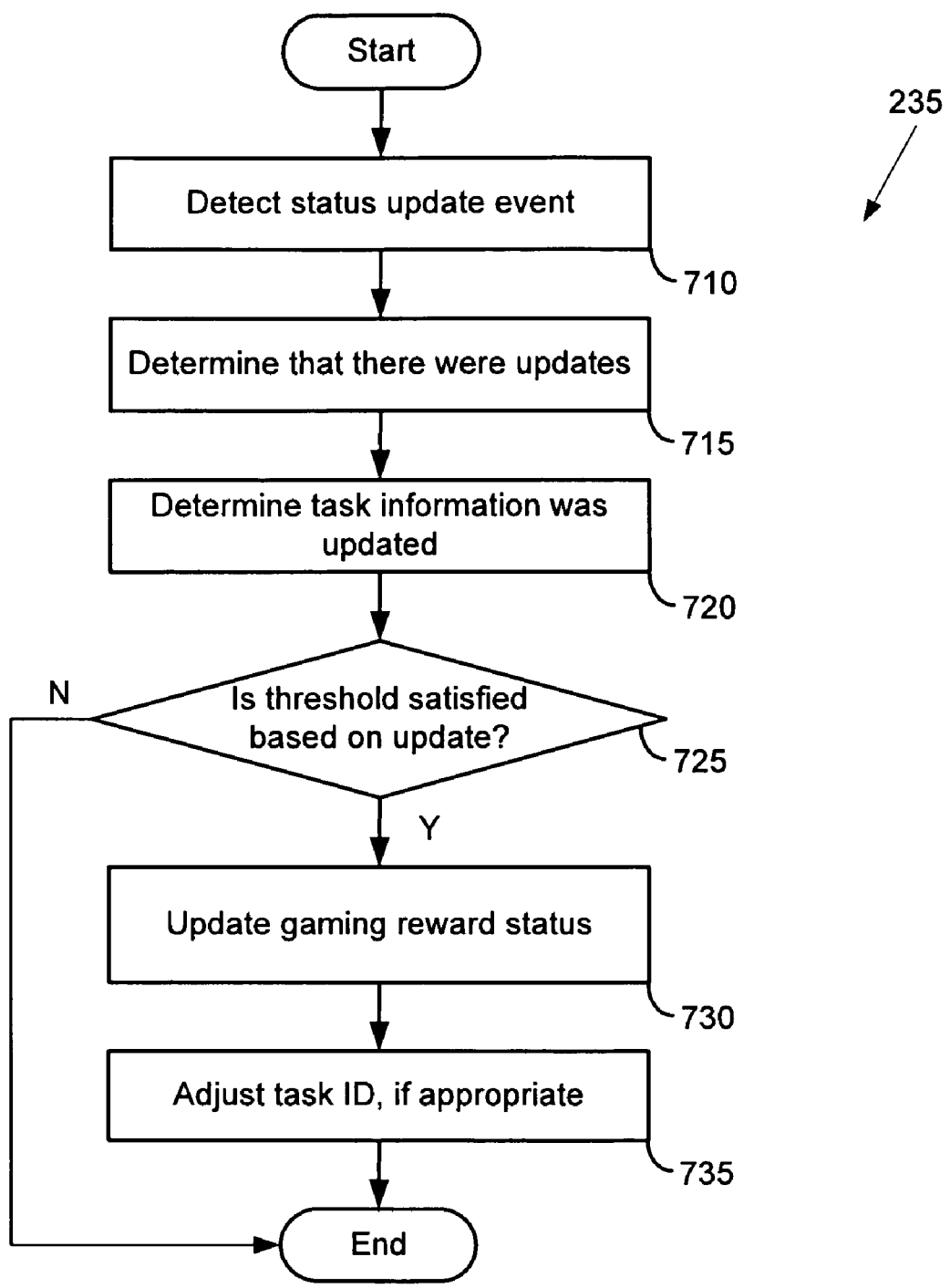
FIG. 7 is a flowchart illustrating an exemplary method for reporting gaming rewards for business goals achieved.

FIG. 7 is a flowchart illustrating an exemplary method 235 for assigning gaming rewards to participants for business tasks achieved. The method of FIG. 7 provides more detail for step 235 of the method of FIG. 2 and is performed on incentive management server 130. First, a status update event is detected at step 710. A status update event may be a triggered by a timer, received updates, a user request, or some other event.

When a status update event is detected, a determination is made in step 715 as to whether the records in status table 134 have been updated. The selected reward records may have been marked as updated in step 650 of the method of FIG. 6, for example, as part of updating the reward record. For example, in the status table of FIG. 1D, an indication as to whether each record is marked as updated is included in the last column of the table The task identifiers in the marked record are evaluated in step 720 to determine which have been updated. In some embodiments, updates to a particular task identifier may also be marked or flagged. A task identifier marked as having been updated is compared in step 725 to the associated threshold. The business goal threshold associated with a particular task identifier can be determined by reference to business goal table 132. If the threshold is not satisfied, the method of FIG. 7 ends.

If the threshold is satisfied, a gaming reward identifier associated with the task identifier is determined in step 730.

The reward record for the participant(s) satisfying the threshold is updated to reflect that the gaming reward has been earned.

The task identifier may then be adjusted, if appropriate, at step 735. For example, the task identifier may be adjusted to select a next level of achievement. Hence, a task ID number 2 may be adjusted to task ID number 3 after 1,000 products have been sold by a particular participant. The next goal for that particular participant is selling 2000 products. The adjustment may be made automatically based on the same benchmarks (i.e., every 1000 products sold), progressively increasing benchmarks, user-defined benchmarks, or a combination of the foregoing.

Figure 8:
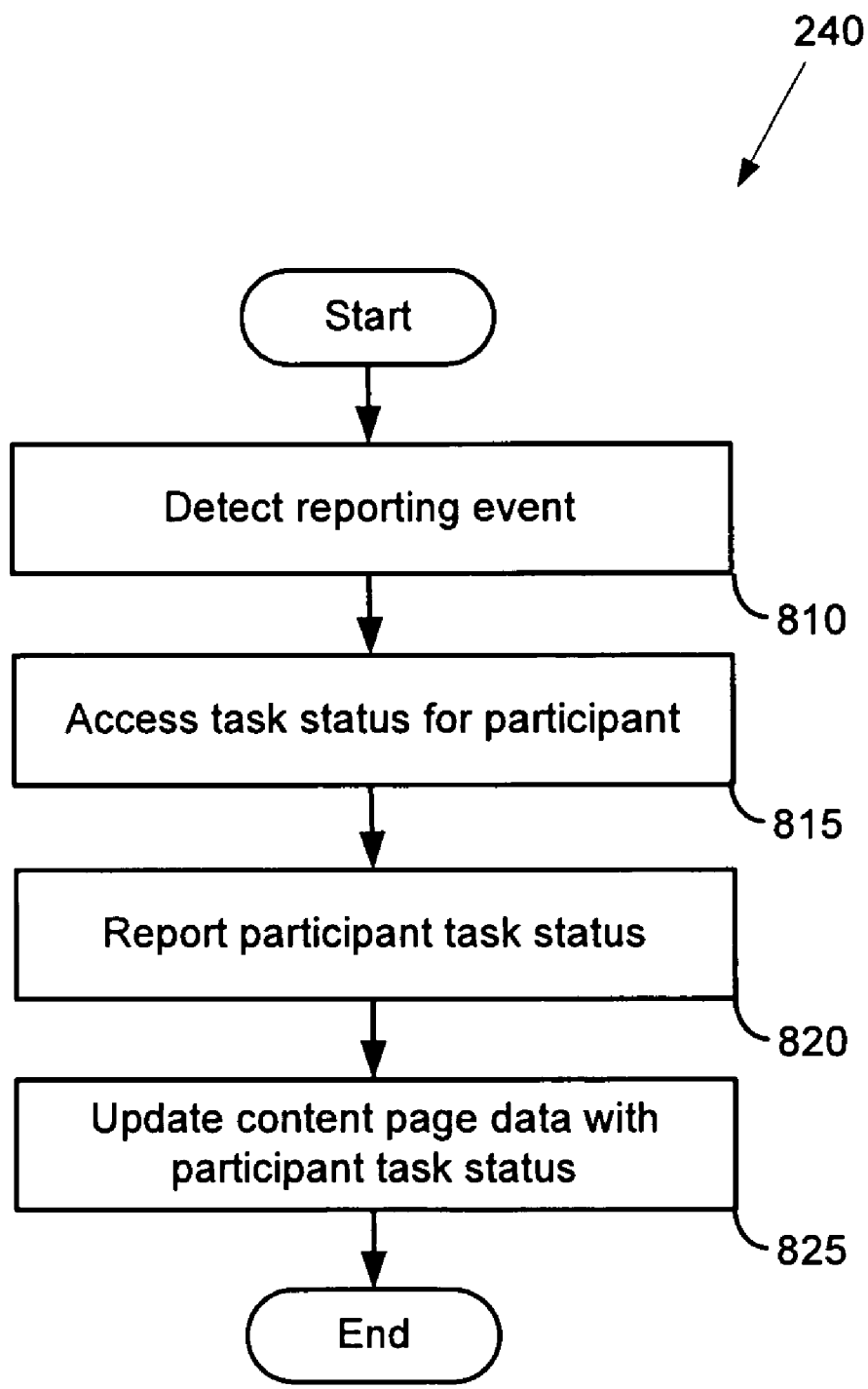
FIG. 8 is a flowchart illustrating an exemplary method for reporting rewards.

FIG. 8 is a flowchart illustrating an exemplary method 240 for reporting rewards. The method of FIG. 8 provides more detail for step 240 of the method of FIG. 4. First, a reporting event is detected at step 810. A reporting event may be triggered periodically, in response to user request, or in response to some other event at reporting server 140. If a reporting event is detected, reward status for a participant is accessed at step 815, and the status is reported at step 820. Reporting may include providing gaming reward information associated with one or more participants, for example, via a text message, e-mail, instant message, or some other communication means. Information designating which recipients receive the status reports, as well as information concerning the means of reporting, may be stored on reporting server 140. In some embodiments, reporting server 140 may maintain a content page, such as a web page, which indicates task status for one or more participants. One or more participants may access the content page using, for example, browser application 162 via web server 164 over network 122. Content page data with the status information may be updated at step 825. A scoreboard on a webpage, for example, may be updated to display a current reward status of each participant. After updating the content page data, the method of FIG. 8 ends.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for providing business goal incentives using gaming rewards, the method comprising:
   storing information in memory in a business goal table that contains a listing of various business goals, the information regarding business goals;
   defining the business goals as business tasks and thresholds associated with the business tasks;
   associating the business goals with virtual gaming rewards, the virtual gaming rewards are non-tangible rewards received in an electronic game, the virtual gaming rewards selected from a group consisting of virtual titles, virtual abilities, and virtual powers;
   associating the virtual gaming rewards with participants who achieve particular business goals;
   receiving at a server task data from a reporting device, the task data indicating participant progress in performance of the business task associated with the business goal;
   determining that the task data meets the threshold associated with the business goal, the determination taking place at the server;
   assigning the virtual gaming reward associated with the business goal to the participant upon the determination that the task data meets the threshold associated with the business goal, the assignment taking place at the server;
   generating a report concerning the virtual gaming reward assigned to the participant;
   generating a metric based on the task data; and
   determining that the task data meets the threshold comprises comparing the metric to the threshold, the task data concerning performance of a plurality of business tasks by a plurality of participants and a portion of the task data is compared to a second threshold.

2. The method of claim 1, further comprising storing information in a memory concerning the assigned virtual gaming reward in association with information concerning the participant.

3. The method of claim 1, further comprising sending a query from the server to the reporting device, the query requesting information concerning the business task performed by the participant.

4. The method of claim 1, wherein the task data is further based on automatic detection of performance of the business task by the participant.

5. The method of claim 1, wherein the task data is further based on user input.

6. The method of claim 1, wherein generating the report includes generating a display of the virtual gaming reward on a content page.

7. The method of claim 1, further comprising sending a notification to the participant, the notification concerning a status of the participant, the status including information regarding progress made by the participant toward performance of the business goal.

8. The method of claim 1, wherein the reporting device is a mobile device associated with the participant and wherein the received task data includes information detected by the mobile device.

9. A method for providing gaming rewards as business incentives, the method comprising:
   defining a business goal as a business task and a threshold associated with the task based on user input;
   storing the business goal in a memory;
   setting the threshold for the business goal, the threshold being set by a server;
   storing in memory in a business goal table that contains a listing of various business goals;
   making an association between virtual gaming rewards and the business goals, wherein the virtual gaming rewards are non-tangible rewards received in an electronic game, the virtual gaming rewards selected from a group consisting of virtual titles, virtual abilities, and virtual powers;
   associating the virtual gaming rewards with participants who achieve a particular business goal;
   receiving task data by the server, the task data concerning a first participant performing the business task associated with the business goal;
   storing in memory the virtual gaming reward in association with information concerning the first participant upon the determination that the task data meets the threshold associated with the business goal;
   generating a metric based on the task data; and
   determining that the task data meets the threshold comprises comparing the metric to the threshold, the task data concerning performance of a plurality of business tasks by a plurality of participants and a portion of the task data is compared to a second threshold.

10. The method of claim 9, wherein the business goal further comprises a second business task and a second threshold associated with the second business task.

11. The method of claim 9, further comprising updating the business goal when the virtual gaming reward is associated with the first participant information.

12. The method of claim 11, further comprising updating the virtual gaming reward associated with the updated business goal.

13. The method of claim 9, wherein the task data further concerns a second participant performing the business task and wherein storing the virtual gaming reward includes storing the virtual gaming reward for the second participant when the task data concerning the performance of the business task by the second participant satisfies the threshold.

14. A non-transitory computer-readable storage medium having embodied thereon a program, the program being executable by a processor to perform a method for providing business goal incentives using gaming rewards, the method comprising:
  storing information in memory in a business goal table that contains a listing of various business goals, the information regarding business goals;
  defining the business goals as business tasks and thresholds associated with the business tasks;
  associating the business goals with the virtual gaming rewards, the virtual gaming rewards are non-tangible rewards received in an electronic game, the virtual gaming rewards selected from a group consisting of virtual titles, virtual abilities, and virtual powers;
  associating the virtual gaming rewards with participants who achieve particular business goals;
  receiving task data indicating participant progress in performance of the business task associated with the business goal;
  determining that the task data meets the threshold associated with the business goal;
  assigning the virtual gaming reward associated with the business goal to the participant upon the determination that the task data meets the threshold associated with the business goal;
  generating a report concerning the virtual gaming reward assigned to the participant;
  generating a metric based on the task data; and
  determining that the task data meets the threshold comprises comparing the metric to the threshold, the task data concerning performance of a plurality of business tasks by a plurality of participants and a portion of the task data is compared to a second threshold.

15. The non-transitory computer-readable storage medium of claim 14, the processor being further executable to generate a query directed to the reporting device, the query requesting information concerning performance of the business task.

16. The non-transitory computer-readable storage medium of claim 14, the processor being further executable to generate the report as a display of the gaming reward on a content page.

17. The non-transitory computer-readable storage medium of claim 14, the processor being further executable to generate a metric based on the task data and to determine that the task data meets the threshold by comparing the metric to the threshold.

* * * * *